United States Patent [19]
Port et al.

[11] Patent Number: 4,980,550
[45] Date of Patent: Dec. 25, 1990

[54] RADON MEASURING DEVICE

[75] Inventors: Eli A. Port, Evanston; Terry W. Liaboe, Highland Park; Edward E. Sebesta, Lake Bluff, all of Ill.

[73] Assignee: Radiation Safety Services, Inc., Morton Grove, Ill.

[21] Appl. No.: 424,873

[22] Filed: Oct. 20, 1989

[51] Int. Cl.[5] .............................................. G01T 5/10
[52] U.S. Cl. .................................. 250/255; 250/253; 250/472.1
[58] Field of Search ...................... 250/253, 255, 472.1

[56] References Cited

U.S. PATENT DOCUMENTS

| | | | |
|---|---|---|---|
| Re. 33,065 | 9/1989 | Alter et al. | 250/253 |
| D. 268,520 | 4/1983 | Le Claire, Jr. | D23/369 |
| 2,500,896 | 3/1950 | Drake | 239/51.5 |
| 2,555,047 | 5/1951 | Logue | 239/58 |
| 2,657,090 | 10/1953 | Meek | 239/55 |
| 2,755,954 | 7/1956 | Antritter | 220/4 B |
| 2,830,845 | 4/1958 | Cottle | 239/43 |
| 3,283,153 | 11/1966 | Geiger | 250/475.2 |
| 3,505,523 | 4/1970 | Becker | 250/473.1 |
| 3,655,975 | 4/1972 | Evans | 250/475.2 |
| 3,665,194 | 5/1972 | Alter et al. | 250/253 |
| 3,783,292 | 1/1974 | Alter et al. | 250/475.2 |
| 4,014,501 | 3/1977 | Buckenmayer | 239/58 |
| 4,063,087 | 12/1977 | Fleischer | 250/253 |
| 4,064,436 | 12/1977 | Ward, III | 250/253 |
| 4,065,972 | 1/1978 | Holub et al. | 73/864.52 |
| 4,258,004 | 3/1981 | Valenzona et al. | 422/123 |
| 4,372,490 | 2/1983 | Le Claire, Jr. | 239/59 |
| 4,385,236 | 5/1983 | Hassib et al. | 250/472.1 |
| 4,457,445 | 7/1984 | Hanks et al. | 220/214 |
| 4,518,860 | 5/1985 | Alter et al. | 250/253 |
| 4,778,992 | 10/1988 | Wheeler | 250/255 |
| 4,800,272 | 1/1989 | Harley et al. | 250/253 |
| 4,926,053 | 5/1990 | Dempsey et al. | 250/376 |

OTHER PUBLICATIONS

Frank et al., "A Diffusion Chamber Radon Dosimeter for Use in Mine Environment", Nuclear Instruments & Methods, 109, pp. 537–539, 1973.
Frank et al., "Radon Dosimetry Using Plastic Nuclear Track Detectors", Nuclear Track Detection, vol. 1, No. ¾, pp. 149–179, 1977.
Urban et al., "Low Level Environmental Radon Dosimetry with a Passive Track Etch Detector Device", Radiation Protection Dosimetry, vol. 1, No. 2, pp. 97–109, 1981.
Frank et al. "Properties of a Small Radon Diffusion Chamber with Plastic Track Detectors", Solid State Nuclear Track Detectors, pp. 531–534, 1982.
Domanski et al., "The Performance of Passive Differentiating Track Detector Containing a Diffusion Barrier", Radiation Protection Dosimetry, vol. 2, No. 1, pp. 27–32, 1981.
Miles et al., "Trial of a Passive Radon Dosemeter for Miners in Wheal Jane Mine", Radiation Protection Dosimetry, vol. 5, No. 2, pp. 95–100, 1983.
Urban et al., "Applications of Passive Radon Dosemeters in Mining Areas", Canadian Nuclear Association, pp. 386–389, 1984.
Urban, "Passive One-Element Track Etch Dosemeter for Simultaneous Measurement of Radon, Thoron and Decay Products in Air", Nuclear Tracks, vol. 12, Nos. 1–6, pp. 685–688, 1986.
Maiello et al., "Egard: An Environmental Gamma-Ray and $^{222}RN$ Detector," Health Physics, vol. 53, No. 3 (Sep. 1987), pp. 301–305.
Bigu et al., "Passive Radon/Thoron Personal Dosimeter Using an Electrostatic Collector and a Diffusion-Junction Detector", Review of Scientific Instruments, vol. 56, No. 1 (Jan. 1985), pp. 146–153.

*Primary Examiner*—Constantine Hannaher
*Attorney, Agent, or Firm*—Silverman, Cass & Singer, Ltd.

[57] ABSTRACT

A radon measuring device having a housing formed of at least two mating portions and coupled together by a fastener. At least one aperture extends through the housing to permit ambient atmosphere to enter the housing and includes a filter or membrane positioned to cover the aperture for filtering radon from other particles from the ambient atmosphere as it enters the housing. A radon detector is positioned within the housing for measuring the concentration of radon in the ambient atmosphere which passes through the aperture and the filter into the housing. A filter support member also is inclined for positioning the filter proximate the aperture and pressing the filter against the housing.

26 Claims, 4 Drawing Sheets

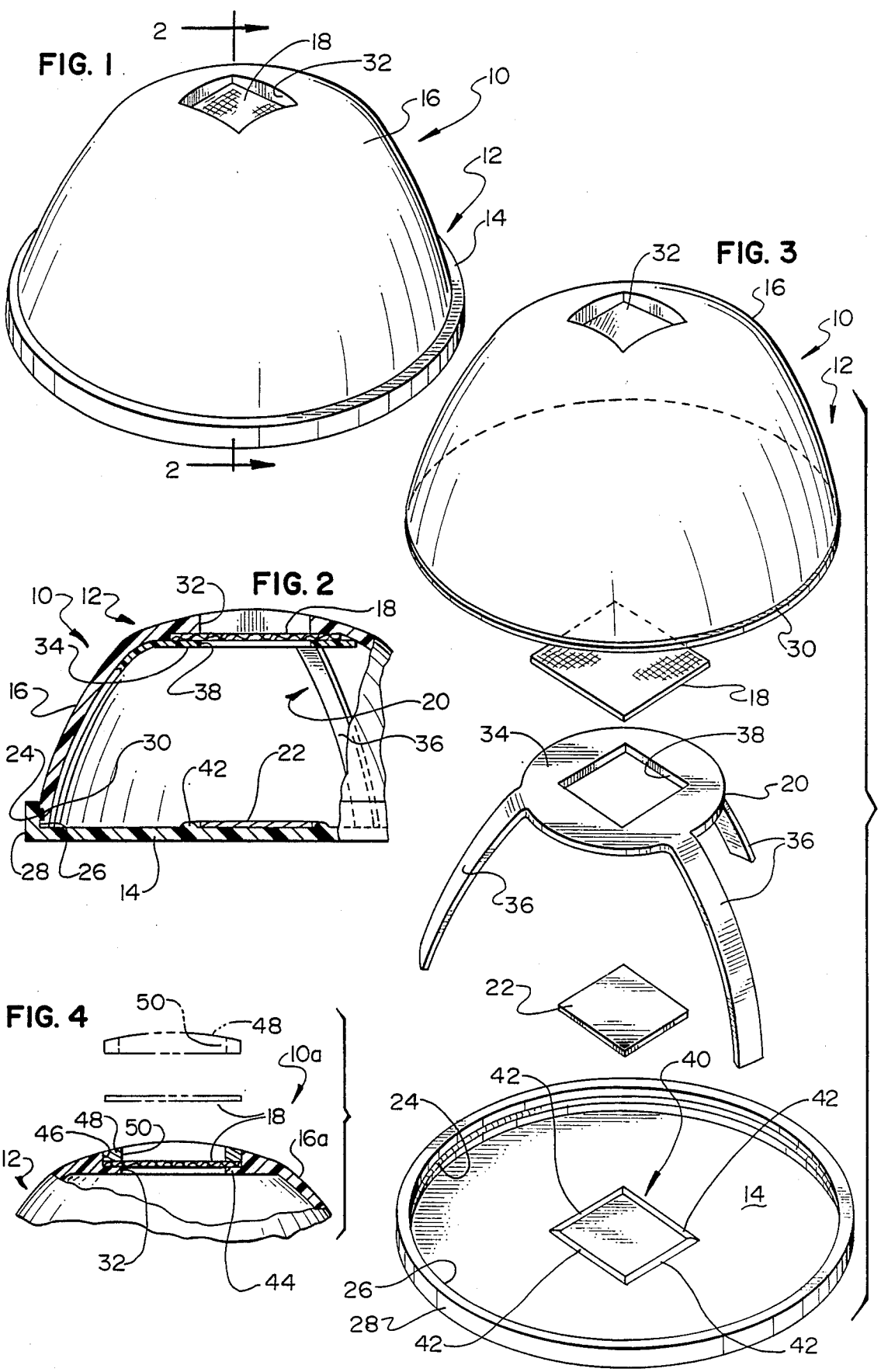

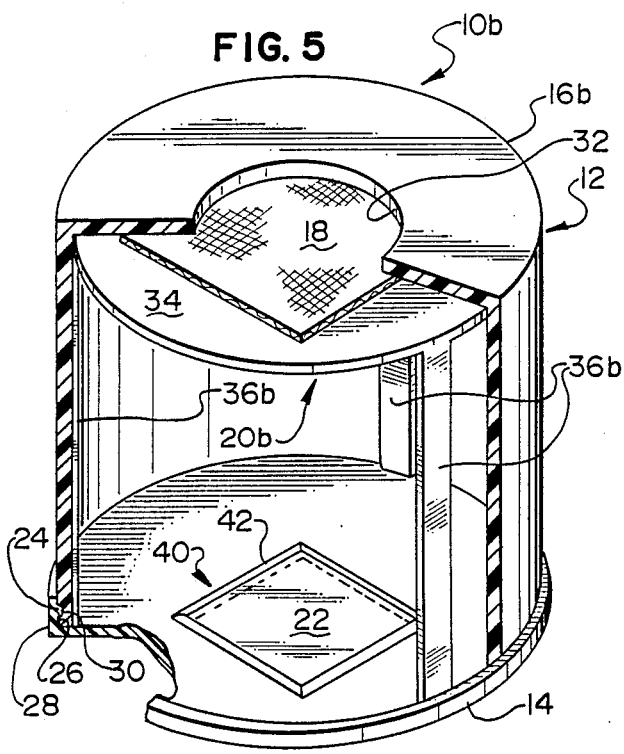
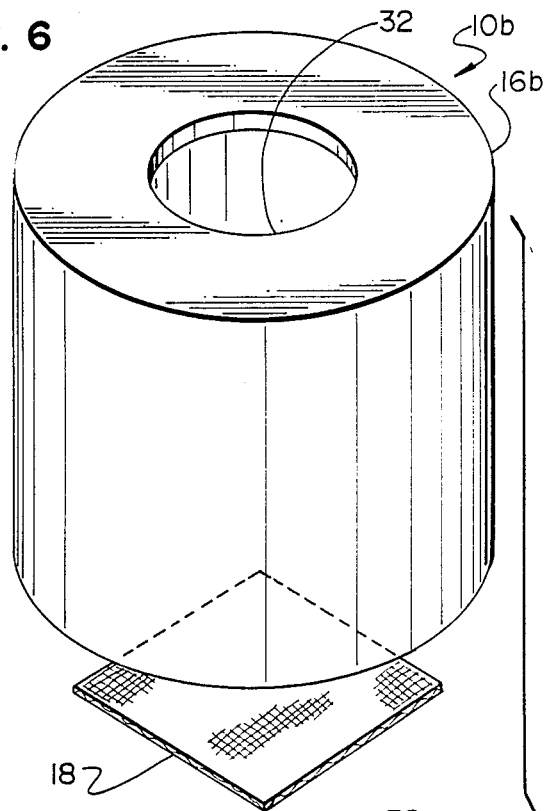
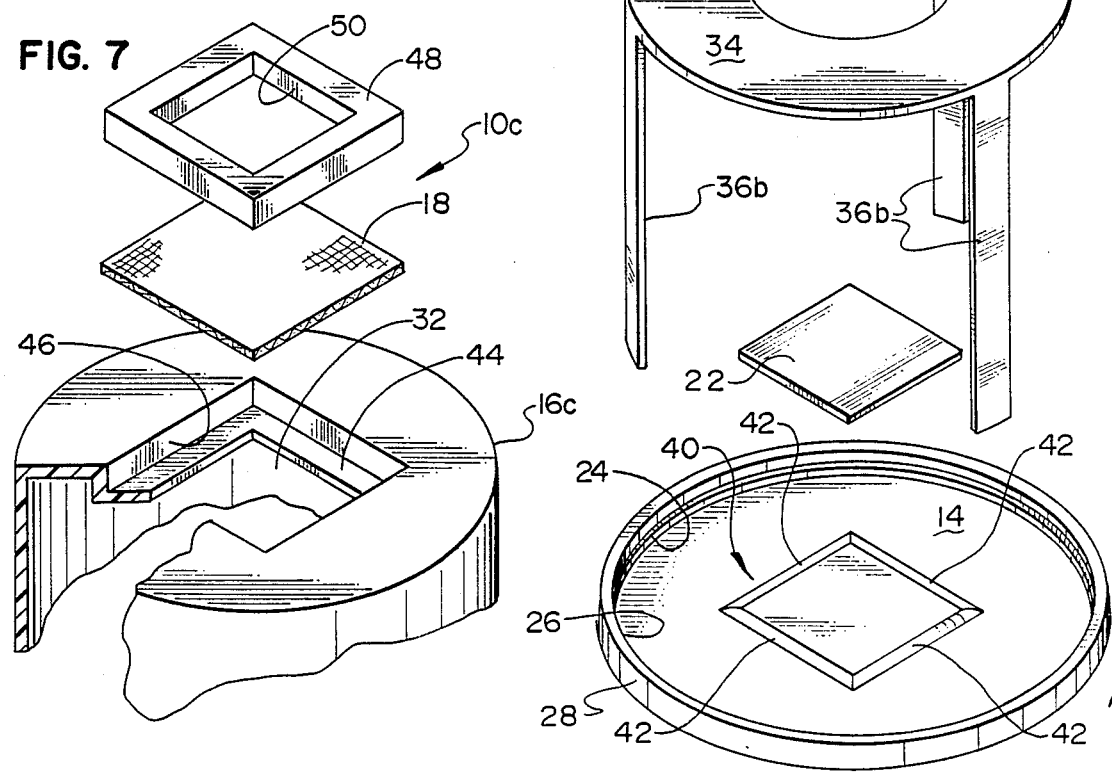
FIG. 5
FIG. 6
FIG. 7

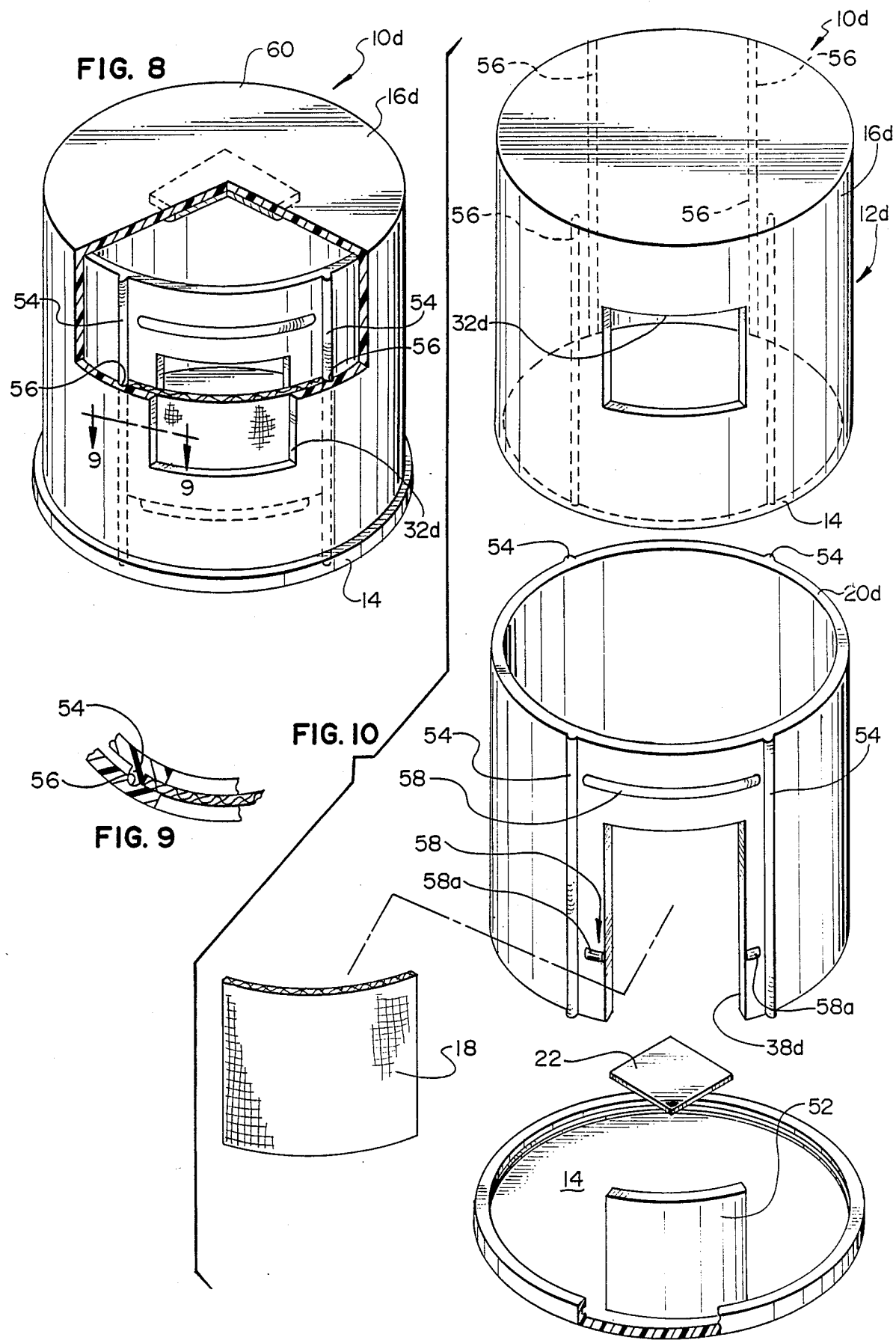

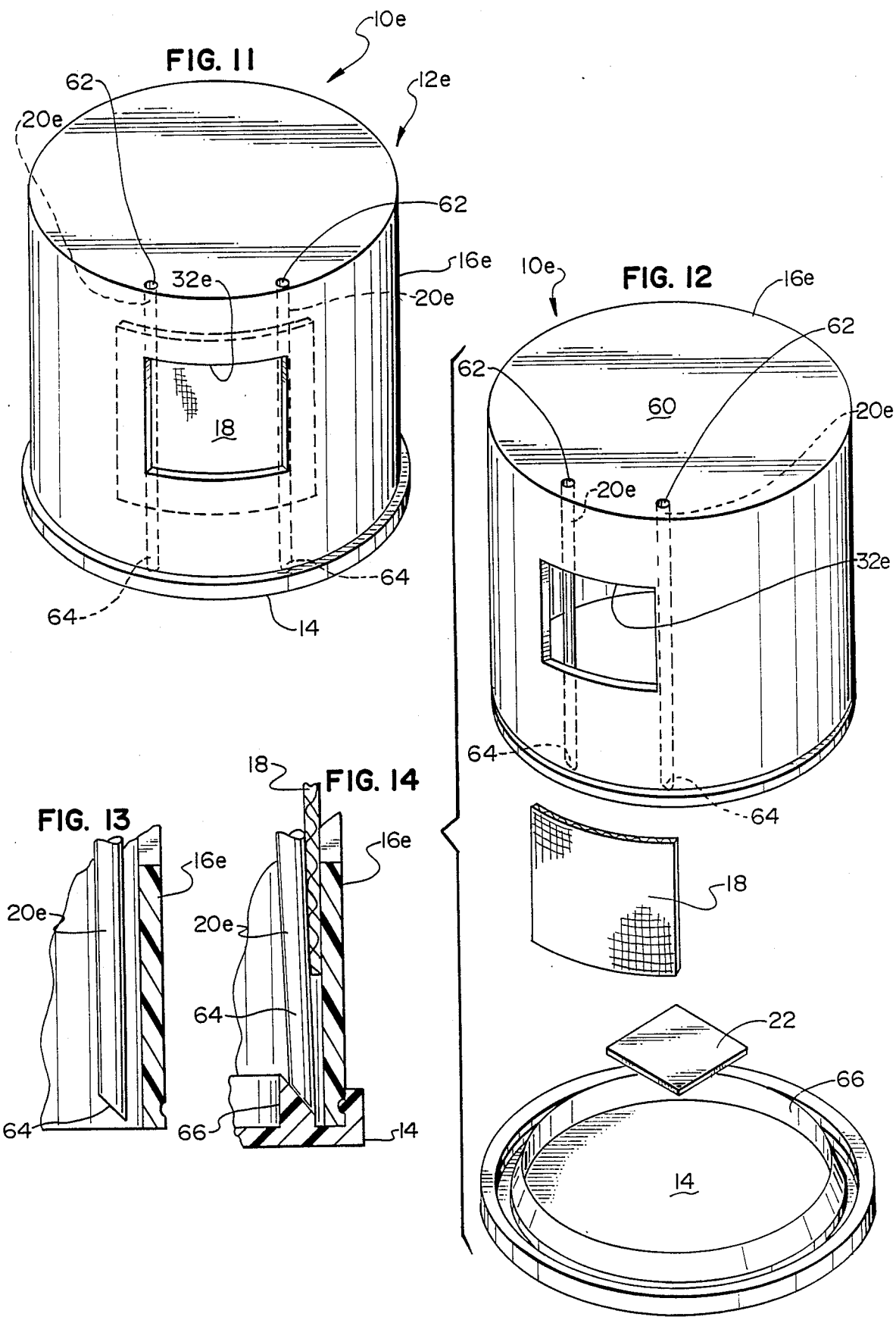

RADON MEASURING DEVICE

BACKGROUND OF THE INVENTION

This invention relates generally to dosimeters for measuring radon and more particularly, to a passive radon measuring device having a two-piece housing or diffusion chamber and a support member for positioning a filter with respect to the housing and including a radon track etch or energy sensitive detector within the housing.

Radon is a colorless, tasteless, and odorless radioactive gas that results from the natural breakdown or radioactive decay of radium. Radon typically is found in high concentrations in soils and rocks containing uranium. It is believed that human exposure to elevated levels of radon can lead to an increased risk of developing lung cancer, depending upon the concentration of radon and the length of exposure.

Recent studies have indicated that radon can accumulate in dangerous concentrations in residences and other structures, and particularly in the lower levels of buildings which typically have poor ventilation and into which radon enters from the surrounding soil. Radon can enter a structure in numerous ways including through the water supply, dirt floors, cracks in masonry floors and walls, floor drains, sumps and similar openings in the foundation of the structure.

Various methods and devices have been employed for detecting radon. The two least expensive and most readily available devices are the charcoal canister and the alpha track detector. Both of these devices are passive devices that are exposed to the air in a home or other structure for a prescribed period of time and then are sent to a laboratory for analysis. Although charcoal canisters are usable for a test period of one to seven days, they are somewhat less reliable than alpha track detectors.

The most basic alpha track detector is constructed as a housing or diffusion chamber in the form of a small cup having a strip of alpha track registration material affixed to the inside of the housing. When the track registration material is exposed to radon or its progeny (radioactive decay products of radon) the alpha particles produced by the radioactive decay of the radon or progeny cause minute damage tracks to occur on the material. Such tracks subsequently can be enlarged and made visible by chemical or electrochemical etching or other methods, for instance, and the concentration of radon present in a particular test area can be measured Although an isolated piece of track registration material can be placed in an environment for detection of radon, it is preferable that some tYpe of housing or diffusion chamber be used, such as the cup housing referred to above. A housing and membrane or filter isolates the registration material from the ambient air, which may contain concentrations of radon progeny, and enables the material to be exposed to radon entering the housing from the environment and the daughters produced in the housing. Additionally, it is desirable to provide a membrane or filter over the entrance to the housing to prevent contamination from other sources. The sensitivity of these types of detectors depends upon the size, shape and material used in their construction. More importantly, the position of the detector strip within the device also can affect the performance and reliability of these detectors. Care must also be taken to prevent tampering with the detector before analysis in the laboratory, as well as maintaining the detector in an optimum position for receiving alpha particles from radon and its progeny within its interior during the test period.

One example of a radon detector having a housing and a filter is disclosed in U.S. Pat. No. 4,518,860. That patent discloses a track registration detector for radon and radon progeny products having a housing with a removable circular apertured closure cap for retaining a strip of track registration material within its interior. The strip is retained within the housing by integrally formed upstanding ribs which form both a pedestal support and a transverse support for the strip and position the strip in juxtaposition with the apertures of the cap with a circular filter sandwiched therebetween. The presence of radon is measured on the side of the strip opposite the filter and apertured cap. The cap includes a solid circular portion in its center to provide a radiation absorber shield for the top surface of the strip. The entrance area of this detector is capable of being blocked by an item positioned adjacent to the apertures, and, since the detector is typically placed with its apertured cap facing upward, can become clogged by dust and dirt particles falling naturally within the ambient air.

Other detectors are of a size most suitable for use as a personal dosimeter or for exploration purposes.

Another example of a radon detector is shown in co-pending U.S. Pat. application Ser. No. 07/299,036 filed Jan. 29, 1989 entitled "Radon Measuring Device" which is assigned to the same assignee as the present application. In that co-pending application, a track etch radon detector is provided which is of relatively uncomplicated construction and yet achieves the desired advantages of permitting free flow of radon within its interior without exposing the track registration material to ambient air, reduces the chance of becoming blocked with foreign material or adjacent items, and provides a seal of the component parts to resist and/or prevent tampering other than by an authorized testing facility. The construction of such a detector has a relatively large sensitive volume and detector area and therefore can be used for the same time period as charcoal canisters but without the inadequacies of such charcoal canisters.

The present invention provides a track etch radon detector which readily can be molded and assembled with relatively uncomplicated molds and molding procedures while permitting the desired flow of radon within the housing to contact the track registration material and filtering the unwanted particles of the ambient air.

SUMMARY OF THE INVENTION

The invention is characterized by a radon measuring device having a housing formed by at least two mating portions secured together, in which at least one of the mating portions includes at least one aperture for the passage of radon from the ambient atmosphere into the interior of the housing. A membrane or filter is positioned to cover the aperture by a filter support member to filter the ambient atmosphere passing into the housing. A radon detecting element is positioned within the housing interior for measuring radon in the ambient atmosphere passing into the housing.

Various objects and advantages of the invention will become apparent in accordance with the disclosure herein in which the preferred embodiments are described in detail in the specification and illustrated in the accompanying drawings. It is contemplated that minor variations may occur to the skilled artisan without departing from the scope or sacrificing any of the advantages of the invention.

BRIEF DESCRIPTION OF THE DRAWINGS

FIG. 1 is a perspective view of one embodiment of the assembled radon measuring device of the invention;

FIG. 2 is a sectional view taken along the line 2—2 of FIG. 1, in the direction indicated generally;

FIG. 3 is an exploded perspective view of the device illustrated in FIG. 1;

FIG. 4 is a fragmentary partial sectional view of the top of the housing of the embodiment of FIG. 1, illustrating a variation in which the filter is positioned to cover the housing aperture from the exterior of the housing;

FIG. 5 is a perspective view of an alternate embodiment of the device of the invention shown in partial section;

FIG. 6 is an exploded perspective view of the device illustrated in FIG. 5;

FIG. 7 is a fragmentary partial sectional view of the top of the housing of the embodiment of FIG. 5, illustrating a variation in which the filter is positioned to cover the housing aperture from the exterior of the housing;

FIG. 8 is a perspective view of another alternate embodiment of the device of the invention shown in partial section;

FIG. 9 is an enlarged sectional view taken along the line 9—9 of FIG. 8, in the direction indicated generally;

FIG. 10 is an exploded perspective view of the device illustrated in FIG. 8;

FIG. 11 is a perspective view of a further alternate embodiment of the device of the invention;

FIG. 12 is an exploded perspective view of the device illustrated in FIG. 11;

FIG. 13 is a fragmentary sectional view of a portion of the housing of FIG. 12; and FIG. 14 is a fragmentary sectional view of the housing of FIG. 12 illustrating the manner in which the filter is positioned therein.

DESCRIPTION OF THE PREFERRED EMBODIMENTS

The radon measuring device embodying the invention is designated generally in the drawings by the reference numeral 10. Referring to FIGS. 1-3, a first embodiment of the radon device 10 is illustrated. The device 10 includes a housing 12 having two mating portions: a first mating or housing portion 14 being a base and a second housing portion 16 being coupled thereto. The housing 12 further includes a filter or membrane 18, a filter or membrane support member 20 and a radon detector or foil 22.

The housing 12 generally is in the form of a domed structure where the first housing portion 14 is constructed as a disc shaped base member and the second housing portion 16 is constructed as a dome. Typically, the housing 12 is positioned during use as illustrated in FIG. 1 with the base member 14 substantially parallel to the horizontal plane. It is to be noted, however, that the housing 12 also may be used with the base member 14 substantially parallel to the vertical plane or any other desired plane. Furthermore, the particular shape and/or size of the housing 12, and thus the first and second housing portions 14 and 16 respectively, can vary. For instance, the first housing portion 14 can be constructed in the form of a cylinder rather than a disc, or any other desired shape, without departing from the teachings of the present invention.

The housing 12 can be constructed of a plastic material having an electrostatic property similar to that of the detector foil 22 or of a conductive material so that the housing 12 does not attract, repel or otherwise affect the free movement of alpha particles within the housing 12. If the material forming the housing 12 has electrostatic properties which are the same as the foil 22, radon progeny will deposit throughout the housing 12. Preferably, the housing 12 is constructed of electrically conductive static dissipative material with the result that radon progeny will tend to deposit uniformly on the foil 22 rather than unevenly and on the housing walls because of static charge buildup.

As FIGS. 2 and 3 illustrate, in order to couple the base member 14 to the dome member 16, a fastening member is formed around the perimetric edges of the base member 14 and the dome member 16. The fastening member includes at least one circular rib 24 positioned along an interior surface 26 of an upturned lip 28 of the perimetric edge of the base member 14 and at least one complementary groove 30 formed along the outside perimetric surface of the dome member 16. Thus, the dome member 16 can be snap fitted within the lip 28 of the base member 14 thereby seating the rib 24 within the groove 30. If desired, an additional sealing or coupling member (not illustrated) can be included to restrict or prevent opening of the housing 12 and provide an indication that the housing 12 has been opened.

To enable passage of ambient atmosphere into the housing 12, the dome member 16 includes at least one aperture 32. The aperture 32 can be of any desired shape and size so long as it provides adequate passage of ambient atmosphere into the housing 12. Also, the aperture 32 can be located anywhere on the surface of the dome member 16.

In order to filter the undesirable particles of the ambient atmosphere and allow radon to be transmitted into the interior of the housing 12 for registration with the foil 22, the filter or membrane 18 is utilized to cover the aperture 32. In this embodiment, the filter 18 covers the aperture 32 on the interior of the housing 12. The filter 18 preferably is formed from a material that separates radon from dust particles, aerosols, and other undesired particles in the ambient atmosphere and typically is made of paper, fiberglass or other filter material or a semipermeable membrane material to a desired thickness and filtering capability.

In order to position the filter 18 against the interior surface of the dome member 16 to cover the aperture 32, the filter support member 20 is utilized. The filter support member 20 generally is in the form of a spider having a disc shaped base 34 and a plurality of depending leg members 36. Three leg members 36 are shown but the number and shape of the leg members 30 can vary.

The base 34 also can include at least one aperture 38 having substantially the same size and shape as the aperture 32 of the dome member 16. Thus, as FIG. 2 illustrates, when the spider 20 is positioned within the assembled housing 12, the bottom of the legs 36 seat against the bottom interior surface of the dome member 16 and the interior surface of the base member 14. At the same time, the base 34 engages the interior of the dome member 16 proximate the aperture 32, thereby holding or trapping the filter 18 therebetween and extending across the aperture 32 to accomplish the desired filtering of ambient atmosphere. Thus, the filter 18 is pressed into place against the dome member 16 and across the aperture 32. Preferably, the legs 36 are bent inward during assembly which effectively provides a resilient spring action to the spider 20 which forces the base 34 to hold the filter 18 as described.

The detector foil 22 can be any type of desired alpha sensitive material such as, for example, a polycarbonate foil or similar type of detector. As FIG. 3 illustrates, in order to position the foil 22 within the housing 12, the base member 14 can include a seat 40 formed on the interior surface of the base member 14 by upstanding walls 42. The seat 40 can be formed in any shape and size to substantially correspond to the shape and size of the foil 22 so long as it accepts the foil 22 therein. If desired, the seat 40 also can be designed to hold the foil 22 therein, or an adhesive or similar fastening method can be utilized to prevent the foil 22 from shifting within the housing 12. It is to be understood that the foil 22 can be positioned at any desired location within the housing 12 by appropriate positioning of the seat 40 or use of another fastening method.

To assemble the device 10, the foil 22 is first positioned within the seat 40. Next, the spider 20 is positioned so that the bottom of its legs 36 are positioned within the confines of the lip 28. In order to accomplish this, it may be necessary to inwardly bend one or more of the legs 36, thereby providing the above mentioned spring type fit of the spider 20 within the housing 12. Next, the filter 18 is positioned on the top of the base 34 of the spider 20 so that it covers the aperture 38. If desired, one or more edges of the filter 18 can be positioned by ribs (not illustrated) or otherwise secured to the base 34 by an adhesive or similar fastening method to prevent shifting of the filter 18. Finally, the dome member 16 is inserted over the spider 20 and the filter 18 and the rib 24 is seated within the groove 30. As with the spider 20, it may be necessary to slighty bend or deform the dome member 16 in order to accomplish the desired seating of the rib 24 within the groove 30.

During use, the device 10 is positioned in an area where the concentration of radon is to be measured. As explained above, such an area typically is an enclosed area such as the basement of a structure or any other desired area. The device 10 may be positioned as shown in FIG. 1 with the base member 14 parallel with the horizontal plane and the dome member 16 facing upward. Alternatively, the device 10 can be provided with a hook on any convenient surface to suspend the device in any desired location. Thereafter, the device 10 is left in the area for a prescribed period of time, typically one to fifty-two weeks. After such time has passed, the device 10 then is sent to a designated laboratory for analysis. Upon arrival at the laboratory, the device 10 first is inspected for any signs of tampering and then is broken apart into its two housing portions 14 and 16. The radon detector foil 22 then is removed and the above described etching or other process is performed on the radon detector foil 22 to provide a measure of the concentration of radon in the monitored area.

FIG. 4 illustrates a variation of the device 10a where common elements are referred to by the same reference numerals. In this embodiment, the spider 20 is eliminated and the filter is 18 secured to the housing 12 from the exterior of the housing 12. In order to position the filter 18 across the aperture 32, the aperture 32 is formed with an inwardly extending shoulder portion 44 formed around the inside perimeter of the aperture 32. Thus, the filter 18 can be seated within a recess 46 formed above the shoulder 44 from the outside of the housing 12 to cover the aperture 32. In order to hold the filter 18 within the recess 46, a filter support member in the form of an insert 48 having at least one aperture 50 substantially corresponding to the at least one aperture 32 of the dome member 16a is inserted within the recess 46 above the filter 18 and is secured therein such as by a snap fit, for example. Thus, the filter 18 is pressed into place against the shoulder 44 by the insert 48.

To assemble the device 10a of FIG. 4, the foil 22 is placed on the base member 14 and the base member 14 is coupled to the dome member 16a as previously described. Next, the filter 18 is inserted into the recess 46 and the insert 48 is inserted over the filter 18 thereby fixing the filter 18 therein. Alternatively, the filter 18 can be secured within this recess 46 with the insert 48 before the dome member 16a is coupled to the base member 14.

FIGS. 5 and 6 illustrate an alternate embodiment of the device 10b where common elements are referred to by the same reference numerals. This embodiment is similar to the embodiment of FIGS. 1-3 except in this embodiment, the second housing portion 16b is formed as a cylinder of any cross-section. Additionally, the spider 20b is slighty modified so that the legs 16b depend normal from the base 34 to circumscribe a cylinder which fits inside the second housing portion 16b. The remaining components as well as the assembly of the device 10b of this embodiment substantially correspond to those of the embodiment of FIGS. 1-3.

FIG. 7 illustrates a variation of the device 10b of FIG. 5 where common elements are referred to by the same reference numerals. This embodiment is similar to the variation of FIG. 4 except in this embodiment, the second housing portion 16c is similar to the cylindrical housing of the embodiment of FIGS. 5 and 6. Thus, the housing portion 16c includes the shoulder 44 and insert 48 of the embodiment of FIG. 4 and eliminates the spider 20. The remaining components as well as the assembly of the device 10c of this embodiment substantially correspond to those of the embodiments of FIGS. 1-3, 4, and 5-6.

FIGS. 8-10 illustrate another embodiment of the device 10d where again, common elements are referred to by the same reference numerals. In this embodiment, the second housing portion 16d is similar to the cylindrical housing of the embodiment of FIGS. 5 and 6 but the aperture 32d is positioned along the side wall of the cylinder rather than on the top surface thereof. Furthermore, the filter support member 20d is no longer in the form of a spider but a cylindrical housing sized and dimensioned for registry with the inside of the housing portion 16d. The aperture 38d of the filter support member 20d similarly is positioned along the side wall of the cylinder for cooperation with the aperture 32d of the housing portion 16d.

Preferably, for ease of molding, the aperture 38d is formed as a slot extending from the bottom end of the support member 20d to a position along the wall of the cylinder for cooperation with the aperture 32d of the housing portion 16d. The slot 38d cooperates with a semi-circular wall member 52 upstanding from the interior surface of the base member 14 as will be explained in detail below. If desired, the aperture 32d of the housing portion 16d also can be formed as a slot not/ illustrated).

In order to properly align and inhibit rotational movement between the housing portion 16d and the filter support member 20d, the exterior surface of the support member 20d can include at least one engagement member or longitudinal rib 54 extending therefrom which is accepted within a corresponding groove 56 on the interior surface of the housing portion 16d. Preferably, four ribs 54 and four grooves 56 are included, one set on opposite sides of the aperture 32d and slot 38d respectively, and the other two sets on the sides of the cylindrical housing portion 16d and filter support member 20d opposite the first two sets.

As in the previously described embodiments, the filter 18 is positioned over the aperture 32d of the housing portion 16d and is held or pressed in place by the filter support member 20d. In the embodiment of FIGS. 8-10, however, since the filter support member 20d includes the aperture 38d formed as a slot, the bottom side of the filter 18 will not be supported by the filter support member 20d. Thus, when the housing 12d is assembled, the upstanding wall 52 of the base 14 provides support to the bottom side of the filter 18 to prevent the filter 18 from moving into the interior of the housing 12d.

Additionally, in order to prevent longitudinal movement of the filter 18 between the housing portion 16d and the filter support member 20d, the exterior of the filter support member 20d can include filter support ribs 58 which extend semi-circumferentially around the wall of the support member 20d, between the longitudinal ribs 54. One rib 58 is positioned above the slot 38d to inhibit upward movement of the filter 18 and one rib 58 is bisected by the slot 38d to include a portion 58a on either side of the slot 38d to inhibit downward movement of the filter 18. Accordingly, the filter 18 is constrained between the housing portion 16d and the filter support member 20d so that it covers the portion of the slot 32d of the housing portion 16d above the upstanding wall 52.

In the FIG. 8-10 embodiment, since the aperture 32d of the housing portion 16d is positioned in the side wall thereof, the foil 22 can be positioned on either the base 14 or a wall 60 of the housing portion 16d. In either event, a seat (not shown in FIGS. 8-10) can be included along with an attachment means for mounting the foil 22 therein.

To assemble the device 10 of the FIG. 8-10 embodiment, the foil 22 is first placed in a seat on either the base 14 or the wall 60 of the housing portion 16d. Next, the filter support member 20d is positioned on the base 14 and the filter 18 is positioned over the portion of the slot 38d which is left open above the upstanding wall 52 and between the longitudinal ribs 54 and the semi-circumferential ribs 58 and 58a. Finally the housing portion 16d is inserted over the filter support member 20d with the grooves 56 aligned with the longitudinal ribs 54 and the bottom of the housing portion 16d is snap fit onto the base member 14 as described in previous embodiments.

FIGS. 11-14 illustrate a further alternate embodiment of the device 10e where common elements are referred to by the same numerals. This embodiment is similar to the embodiment of FIGS. 8-10 except that the separate filter support member 20d is replaced with at least two rods 20e which depend from the interior surface of the wall 60 of the housing portion 16e and extend past the aperture 32e thereof.

Proximal ends 62 of the rods 20e are positioned slightly inward from the side wall of the housing portion 16e. Also, the rods 20e are slightly tapered at their distal ends 64. Thus, as FIG. 14 illustrates, the distal ends 64 of the rods 20e are forced toward the side wall of the housing portion 16e by an inwardly tapered circular flange or seat 66 which extends upwardly from the base 14 to move the rods 20e toward the side wall of the housing portion 16e and trap the filter 18 between the housing portion 16e and the rods 20e. Thus, the filter 18 is pressed into place against the housing portion 16e across the aperture 32e by the rods 20e.

If desired, as in the previously described embodiment, the aperture 32e can be formed as a slot for ease of molding and the base 14 can include the upstanding semi-circular wall portion 52 for support of the filter. It also is to be noted that the foil 22 can be positioned on the base 14 or the inside surface of the wall 60 of the housing portion 16e.

To assemble the device 10e of the FIG. 11-14 embodiment, the foil 22 is placed in a seat (not shown in FIGS. 11-14) and the filter 18 is positioned between the rods 20e and the housing portion 16e. Then, the housing portion 16e can be coupled to the base 14 as described previously to position the filter 18 across the aperture 32e.

Modifications and variations of the present invention are possible in light of the above teachings. For example, although the device 10 is illustrated for use as a stand alone unit, it also can be mounted to a wall or carried by a user. It is therefore to be understood that within the scope of the appended claims, the invention may be practiced otherwise than as specifically described.

What is claimed and desired to be secured by Letters Patent of the U.S. is:

1. A radon measuring device comprising:
   a housing formed of at least two mating portions a first of said mating portions being formed as a disc;
   fastening means for coupling said at least two mating portions together positioned around the perimetric edge of said disc for coupling said disc to a second of said at least two mating portions;
   at least one aperture in the second mating portion of said housing to permit ambient atmosphere to enter said housing;
   filter means positioned to cover said aperture for filtering radon from other particles from said ambient atmosphere as it enters said housing;
   radon detector means positioned proximate to said first mating portion of said housing for measuring the concentration of radon in the ambient atmosphere which passes through said at least one aperture and said filter means into said housing; and
   filter support means for positioning said filter means proximate said aperture of said housing and pressing said filter means against said housing.

2. The device as defined in claim 1 wherein said filter means and said filter support means are positioned within said housing and said filter support means are in registry with at least on of said at least two mating portions of said housing for positioning said filter means proximate said aperture of said housing.

3. The device as defined in claim 1 wherein said second mating portion is formed as a dome having said aperture proximate its center, the perimetric edges of said dome cooperating with said fastening means for coupling said disc to said dome.

4. The device as defined in claim 1 wherein said second mating portion is formed as a cylinder being closed at a first end thereof, said first closed end having said aperture proximate its center, the perimetric edges of the opposite second open end of said cylinder cooperating with said fastening means for coupling said disc to said cylinder.

5. The device as defined in claim 1 wherein said second mating portion includes said aperture which includes a shoulder therearound projecting into the interior of said aperture, said filter means being seated against said shoulder from the exterior of said housing and being secured against said shoulder with an insert having an aperture substantially corresponding to said aperture of said housing, said insert being coupled to said second mating portion by fastening means.

6. The device as defined in claim 1 wherein said second mating portion is formed as a cylinder being closed at a first end thereof, the perimetric edges of the opposite second open end of said cylinder cooperating with said fastening means for coupling said disc to said cylinder, said aperture being positioned in the side wall of said cylinder and said radon detector means being positioned within the housing on at least one of said first end of said cylinder and said disc.

7. The device as defined in claim 1 wherein said filter support means are formed as a cylinder having a diameter slightly smaller than said second mating portion and including at least one aperture through the side wall thereof for registry with said aperture of said side wall of said second mating portion, said filter means being positioned between said second mating portion and said filter support means.

8. The device as defined in claim 1 including engagement means for restricting rotational movement between said second mating portion and said filter support means so that said apertures of said second mating portion and said filter support means remain substantially aligned.

9. The device as defined in claim 7 wherein at least one of said apertures of said second mating portion and said filter support means are formed as a slot extending from a bottom end thereof to a predetermined position along the side wall of said second mating portion or said filter support means.

10. The device as defined in claim 9 wherein said disc includes a semi-circular wall portion upstanding from the interior surface thereof to assist in supporting said filter means within said slot.

11. The device as defined in claim 10 wherein said filter support means include means for inhibiting longitudinal movement of said filter means between said filter support means and said second mating portion.

12. The device as defined in claim 1 wherein said filter support means include at least two rods secured to the interior surface of said second mating portion and extending past said aperture for engagement with said disc to position said filter means within said housing between said rods and said second mating portion.

13. The device as defined in claim 12 wherein said disc includes an inwardly tapered circular flange upstanding from the interior surface of said disc to position said at least two rods toward said second mating portion and trap said filter means between said second mating portion and said at least two rods.

14. A radon measuring device comprising:

a housing formed of at least two mating portions, a first of said mating portions being formed as a disc and the other second mating portion being formed as a dome;

fastening means for coupling said dome to said disc along their respective perimetric edges;

at least one aperture passing through said dome to permit ambient atmosphere to enter said housing;

filter means positioned within the interior of said housing and covering said aperture for filtering radon from other particles from said ambient atmosphere as it enters said housing;

radon detector means positioned within said housing for measuring the concentration of radon in the ambient atmosphere which passes through said at least one aperture and said filter means into said housing; and filter support means for positioning said filter means within said housing proximate said aperture of said housing, said filter support means being formed as a spider having a base including at least one aperture therethrouqh and a plurality of depending leg members, which is retained between said disc and said dome so that said base of said spider positions said filter means proximate said aperture of said dome with said aperture of said spider base being in registry with said dome aperture for passage of said ambient atmosphere therethrough.

15. A radon measuring device comprising:

a housing formed of at least two mating portions, a first of said mating portions being formed as a disc and the other second mating portion being formed as a dome;

fastening means for coupling said dome to said disc along their respective perimetric edges;

at least one aperture passing through said dome to permit ambient atmosphere to enter said housing, said aperture including an inwardly extending shoulder;

filter means for covering said aperture from the outside of said dome and seated about said shoulder for filtering radon from other particles from said ambient atmosphere as it enters said housing;

an insert having at least one aperture therethrough substantially corresponding to said aperture of said dome, said insert securing said filter means against said shoulder from the outside of said dome and being coupled to said dome by fastening means: and radon detector means positioned within said housing for measuring the concentration of radon in the ambient atmosphere which passes through said apertures of said dome and said insert and said filter means into said housing.

16. A radon measuring device comprising:

a housing formed of at least two mating portions, a first of said mating portions being formed as a disc and the other second mating portion being formed as a cylinder being closed at a first end thereof and open at a second opposite end thereof;

fastening means for coupling said disc to said cylinder about the perimetric edges of the disc and the second open end of said cylinder;

at least one aperture passing through said cylinder to permit ambient atmosphere to enter said housing;

filter means positioned within the interior of said housing and covering said aperture for filtering radon from other particles from said ambient atmosphere as it enters said housing;

radon detector means positioned within said housing for measuring the concentration of radon in the ambient atmosphere which passes through said at least one aperture and said filter means into said housing; and filter support means for positioning said filter means within said housing proximate said aperture of said housing, said filter support means being formed a a spider having a base, including at least one aperture therethrough, and a plurality of depending leg members, which is retained between said disc and said cylinder so that said base of said spider positions said filter means proximate said aperture of said cylinder with said aperture of said spider base being in registry with said cylinder aperture for passage of said ambient atmosphere therethrough.

17. The device as defined inc claim 16 wherein said filter support means are formed as a cylinder having a diameter slightly smaller than said second mating portion and including said aperture through the side wall thereof for registry with said aperture of said second mating portion which passes through said side wall thereof, said filter means being positioned between said second mating portion and said filter support means.

18. The device as defined in claim 17 including engagement means for restricting rotational movement between said second mating portion and said filter support means so that said apertures of said second mating portion and said filter support means remain substantially aligned.

19. The device as defined in claim 17 including ribs for restricting longitudinal movement of said filter between said second mating portion and said filter support means.

20. The device as defined in claim 17 wherein at least one of said apertures of said second mating portion and said filter support means is formed as a slot extending from a bottom end thereof to a predetermined position along the side wall of said second mating portion or said filter support means.

21. The device as defined in claim 20 wherein said disc includes a semi-circular wall portion upstanding from the interior surface thereof to assist in supporting said filter means within said slot.

22. A radon measuring device comprising:
a housing formed of at least two mating portions, a first of said mating portions being formed as a disc and the other second mating portion being formed as a cylinder being closed at a first end thereof and open at a second opposite end thereof;
fastening means for coupling said disc to said cylinder about the perimetric edges of the disc and said second open end of said cylinder;
at least one aperture passing through said first closed end of said cylinder proximate the center thereof to permit ambient atmosphere to enter said housing, said aperture including an inwardly extending shoulder:
filter means for covering said aperture from the outside of said cylinder and seated about said shoulder for filtering radon from other particles from said ambient atmosphere as it enters said housing;
an insert having at least one aperture therethrough substantially corresponding to said aperture of said cylinder, said insert securing said filter means against said shoulder from the outside of said cylinder and being coupled to said cYlinder by fastening means; and
radon detector means positioned within said housing for measuring the concentration of radon in the ambient atmosphere which passes through said aperture of said cylinder and said insert and said filter means into said housing.

23. A radon measuring device comprising:
a housing formed of at least two mating portions, a first of said mating portions being formed as a disc and the other second mating portion being formed as a right circular cylinder being closed at a first end thereof and open at a second opposite end thereof;
fastening means for coupling said disc to said cylinder about the perimetric edges of said disc and said second open end of said cylinder
at least one aperture passing through the side wall of said cylinder to permit ambient atmosphere to enter said housing;
filter means positioned within the interior of said housing and covering said aperture for filtering radon from other particles from said ambient atmosphere as it enters said housing;
radon detector means positioned within said housing for measuring the concentration of radon in the ambient atmosphere which passes through said at least one aperture and said filter means into said housing; and
filter support means for positioning said filter means within said housing proximate said aperture of said housing, said filter support means including at least two rods depending from the interior surface of said first closed end of said cylinder and extending past said aperture for engagement with said disc to position said filter means between said rods and said side wall of said second mating portion.

24. The device as defined in claim 23 wherein said disc includes an inwardly tapered circular flange upstanding from the interior surface of said disc to position said at least two rods toward said second cylindrical mating portion and trap said filter means between said at least two rods.

25. A radon measuring device comprising:
a housing formed of at least two mating portions;
fastening means for coupling said at least two mating portions together;
at least one aperture in said housing to permit ambient atmosphere to enter said housing;
filter means positioned to cover said aperture for filtering radon form other particles from said ambient atmosphere as it enters said housing;
radon detector means positioned within said housing for measuring the concentration of radon in the ambient atmosphere which passes through said at least one aperture and said filter means into said housing; and
filter support means formed as a spider in registry with at least one of said at least two mating portions of said housing for positioning said filter means proximate said aperture of said housing and pressing said filter means against said housing.

26. The device as defined in claim 25 wherein said spider includes at least two legs and a base extending therebetween.

* * * * *

UNITED STATES PATENT AND TRADEMARK OFFICE
CERTIFICATE OF CORRECTION

PATENT NO. : 4,980,550
DATED : December 25, 1990
INVENTOR(S) : Eli Port et al.

It is certified that error appears in the above-identified patent and that said Letters Patent is hereby corrected as shown below:

Abstract, line 12, change "inclined" to --included--;

Column 1, line 53, change "tYpe" to --type--;

Column 6, line 30, change "16b" to --36b--;

Column 7, line 2, change "not/" to --(not--;

Column 12, line 2, change "cYlinder" to --cylinder--.

Signed and Sealed this

Nineteenth Day of May, 1992

Attest:

DOUGLAS B. COMER

Attesting Officer     Acting Commissioner of Patents and Trademarks